Nov. 27, 1934.  J. W. W. HOLDEN  1,982,304
LINE, TWINE, AND CORD
Filed Dec. 9, 1933
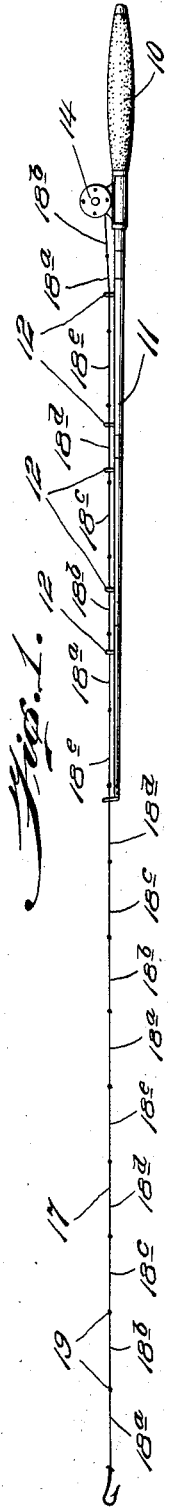
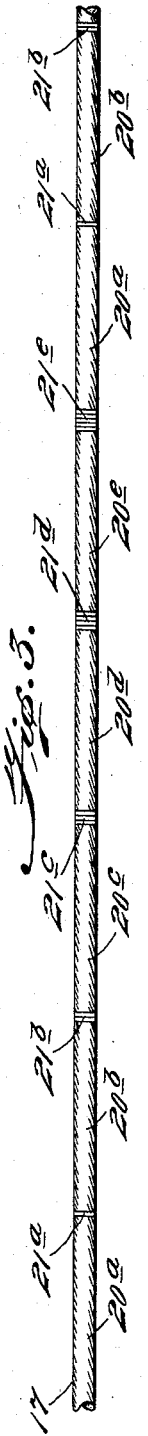
Inventor
John W. W. Holden
By Horatio E. Bellows
Attorney Patented Nov. 27, 1934

1,982,304

UNITED STATES PATENT OFFICE 1,982,304

LINE, TWINE, AND CORD

John W. W. Holden, Providence, R. I., assignor to Ashaway Line and Twine Manufacturing Company, Ashaway, R. I., a corporation of Rhode Island Application December 9, 1933, Serial No. 701,634

1 Claim. (Cl. 28—1)

My invention relates to flexible string members such as lines, twines, cords, and the like, including fish lines used in casting or trolling.

It has heretofore been impossible, when casting or trolling a fish line, to quickly and accurately determine the length of the cast. The length of the cast is not only of value when fishing, but is necessary for all casting contests.

It is the purpose of my invention to provide upon the line distinguishing indicia affording means for determining the linear distance covered by the cast or the length of line released in trolling.

With the above and other objects in part obvious or in part pointed out hereinafter, in view my invention consists of a novel arrangement of lines, twines, cords and the like, more fully described in the detailed description following, in conjunction with the accompanying drawing.

In the drawing which forms a part of this specification,

Figure 1 is a side elevation of a fishing rod equipped with my unreeled fish line embodying my invention, Figure 2 is an enlarged fragmentary side elevation of the line shown in Figure 1, and Figures 3, 4 and 5 are similar elevations of three modified forms of my invention.

It has been found advisable to provide twine, cord, and the like, and particularly fishing line so marked as to visually indicate its length as it is cast, released, or recovered. To this end, I have found the line with length indicia preferably of uniform value, the indicia being integral with the line in order to prevent inaccuracies and to permit rapid unreeling and reeling.

Like reference characters represent like parts throughout the views.

As illustrated, 10 represents the handle, 11 the body, 12 the lateral guides, 13 the tip guide, and 14 the reel of any usual or preferred fishing rod.

A fish line 17 coiled as usual upon the reel is herein shown extended as in casting. The line throughout its length is provided with a series of sections or areas $18^a$, $18^b$, $18^c$, $18^d$, and $18^e$ of equal length. The limits of the sections are diagrammatically indicated in Figure 1 by a series of dots located at the points marked 19, but no actual dots are present upon the line. The sections may be of any preferred uniform length, say one or more yards.

As shown in Figure 2 the sections 18 are defined by selected block colors arranged in series, or, when the length of the line so requires, a plurality of series. One selected color envelops the entire length of each section, and the number of such colors employed, the word "colors" being herein understood to include shades, is optional and is limited only by the spectrum. Purely for the purpose of illustration the number of colors are limited to five in the showing of Figure 2; and in order to avoid tedious repetition, only a portion of a second series of colored sections is included in said figure. Any preferred sequence of colors in a series of sections may be adopted. In this instance the sections $18^a$, $18^b$, $18^c$, $18^d$, and $18^e$ are respectively red, blue, green, yellow, and black, this sequence constituting a single series of integral sections of different color.

A fisherman with the knowledge of the length of the color sections of his line may by glancing at the color of the line adjacent the reel readily determine or estimate the length of his cast.

A modified form of my invention consists in defining the sections by means of one or more series of bands of color upon a line of neutral color, as shown in Figure 3. That is to say, each successive section $20^a$, $20^b$, $20^c$, $20^d$, and $20^e$ is defined at its respective end by a single band $21^a$, a group of two bands $21^b$, a group of three bands $21^c$, a group of four bands $21^d$, and a group of five bands $21^e$. All these bands may be of a single color contrasting with the neutral color of the line, or the several bands of each group may be of various colors contrasting with the color of the line.

A second modified form of my invention is shown in Figure 4 wherein the arrangement and coloring of the section series $24^a$, $24^b$, $24^c$, $24^d$, and $24^e$ are the same as in Figure 2 except that the sections are further successively subdivided by a plurality of equally interspaced bands, in this instance two in number in each section, namely $25^a$, $25^b$, $25^c$, $25^d$, and $25^e$. These bands assist in more particularly defining the extent of the cast.

A further modified form of my invention shown in Figure 5, defines each of the sections of the section series, namely $27^a$, $27^b$, $27^c$, $27^d$, and $27^e$, by a longitudinally disposed thread 28 incorporated in the material of the line extending through its extent, and distinguished by the series of equal color lengths $28^a$, $28^b$, $28^c$, $28^d$, and $28^e$ successively, said lengths corresponding in extent with the sections which they respectively define, and severally distinguished in color, in this instance in red, blue, green, yellow and black successively.

It is thus possible at a glance to determine lengths or divisions or fractions of lengths thereon under all conditions and however unwound from any form of packaging. While the description is specific to a fish line, it is obvious that the marking of twine, cord, and the like for other uses has definite advantages, and that the invention is thus of broad application. The particular type of marking used depends on the requirement for, and the use of, the twine, cord, and the like, and may be changed as required, within the spirit and the scope of the invention as defined in the appended claim.

I claim:—

A line, twine, or cord comprising a series of sections of successively different base colors throughout their lengths, each section being divided at regular intervals by interspaced bands.

JOHN W. W. HOLDEN.